United States Patent Office 3,285,016
Patented Nov. 15, 1966

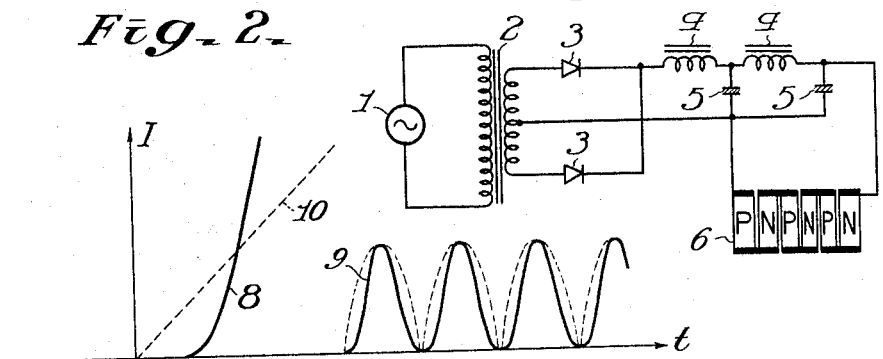
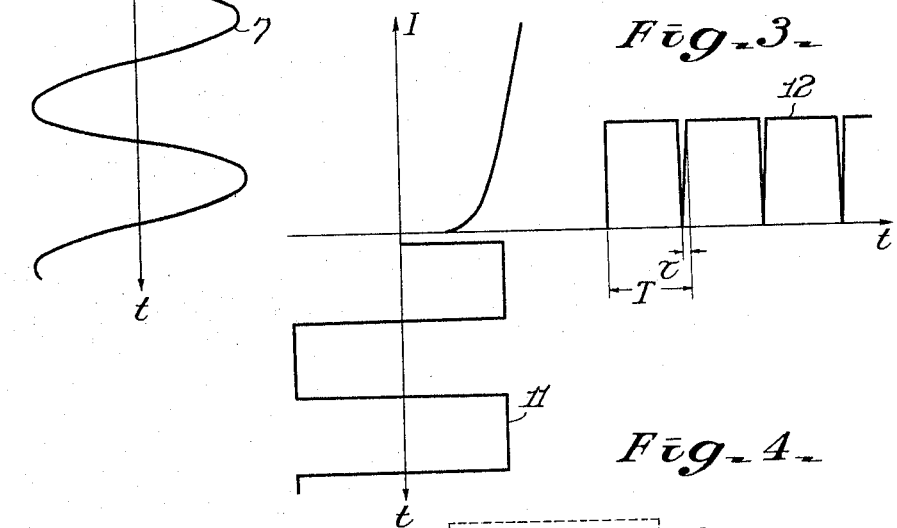
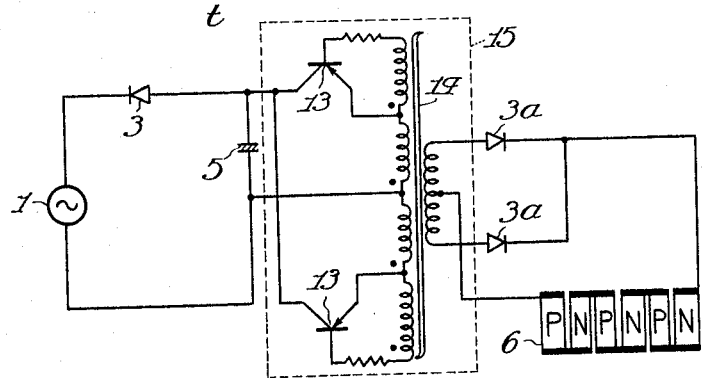

3,285,016
THERMOELEMENT TYPE ELECTRIC POWER SOURCE CIRCUIT
Minoru Nagata, Kodaira-shi, Japan, assignor to Kabushiki Kaisha Hitachi Seisakusho, Tokyo-to, Japan, a joint-stock company of Japan
Filed Apr. 22, 1963, Ser. No. 274,499
Claims priority, application Japan, Apr. 25, 1962, 37/15,915
1 Claim. (Cl. 62—3)

This invention relates to a new thermoelement type electric power source circuit wherein a large temperature difference and low form factor are obtainable.

In general, in a thermoelement type electric power source circuit, the electric power applied to the thermoelement is a direct-current power of low voltage and high current, for example, 1 to 2 volts and 10 to 30 amperes. At the same time, in order to obtain a large temperature difference, it is desirable that the form factor be low. Conventional circuits of this type have had certain disadvantages as will be considered hereinafter.

The present invention is characterized by a thermoelement type electric power source circuit comprising a rectangular-wave generator caused by direct current to generate a rectangular wave, means for supplying the said direct current, means for converting the said wave so generated into power of low voltage and high current, a thermoelement, and rectifying means for rectifying the said power through the use of semiconductor elements to produce a current and for applying the said current to the said thermoelement, the type of the said rectifying means being selected from the group consisting of bridge rectifying types and full-wave rectifying types.

The nature, principle, objects, and details of the present invention will be best understood by reference to the following description, taken in conjunction with the accompanying drawings in which like parts are designated by like reference numerals and letters, and in which:

FIGURE 1 is a circuit diagram showing an thermoelement type electric power source circuit of the known type;

FIGURE 2 is a graphical representation showing waveforms produced by rectifying low voltage by means of a semiconductor diode;

FIGURE 3 is a graphical representation showing waveforms to be referred to in a description of the principle of the present invention; and FIGURE 4 is a circuit diagram of one embodiment of the thermoelement type electric power source circuit according to the present invention.

Referring to FIGURE 1, which shows a conventional thermoelement type electric power source circuit, electric power is supplied by an alternating current source 1 to a transformer 2, the primary and secondary voltages of which are, respectively, high and low and the output terminals of which are connected to rectifiers 3 such as semiconductor diodes. The remainder of the circuit comprises smoothing chokes 4, smoothing capacitors 5, and thermoelements 6 connected as shown.

When, in a circuit of this arrangement, a voltage from the A.C. power source 1 is impressed on the transformer 2, and the low-voltage sinusoidal wave 7 of the output thereof is full-wave rectified according to a rectification characteristic curve 8 of the rectifiers such as semiconductor diodes, as indicated in FIGURE 2, the rectified waveform assumes a form as indicated by the rectification curve 9 because of reasons arising from the poor low-voltage characteristics of the semiconductor diodes, and the form factor increases remarkably.

By denoting the form factor of said rectified waveform by $\lambda_f$, and denoting the maximum temperature difference due to the application of an ideal direct-current by $\Delta T_j$ max., the maximum temperature difference $\Delta T_j$ max.$a$ is represented by the following relation.

$\Delta T_j$ max.$a = 1/\lambda_f \cdot \Delta T_j$ max., which indicates that a high form factor $\lambda_f$ is extremely disadvantageous. Accordingly, a rectifying means providing rectification of a linear and good rectification characteristic in the low-voltage region, as indicated by curve 10 shown by dotted line in FIGURE 4, is necessary. Heretofore, however, it has not been possible to construct such a rectifying means. Accordingly, it has been necessary to resort chiefly to the ample formation of a smoothing circuit for the rectified wave. Consequently, it has been necessary to connect choke capacitors of large current capacity, which have given rise to the disadvantages of extremely heavy weight, large power loss due to the resistance component of the choke, and the resulting high cost. Furthermore, conventional rectifying means have had the further disadvantage of slow response in the case of their use in certain circuits such as temperature-control circuits because of the time constant due to the choke capacitors.

The present invention, in view of the above-described state of the art, contemplates the elimination or substantial minimization of the above-stated disadvantages.

The principle of the present invention will first be described with reference to FIGURE 3. In the case when a voltage having a rectangular wave 11 is applied to a semiconductor diode having the rectification characteristic curve 8, and full-wave rectification is carried out, the rectified waveform assumes a form such as is indicated by curve 12, and the form factor $\lambda_f$ becomes $\lambda_f = T/(T-\tau)$, where T is the width of one cyclic period, and $\tau$ is the gap width of one cyclic period. Since, ordinarily, $\tau$ can be readily caused to be 1 to 2 percent of T, it is possible to obtain a $\Delta T_j$ max.$a$ which is 95 percent or more of $\Delta T_j$ max., even without the use thereafter of a smoothing circuit, in almost all cases.

The above-mentioned embodiment will now be described in conjunction with FIGURE 4. The circuit shown in FIGURE 4 includes transistors 13 for generating rectangular waves and an oscillation transformer 14 with a core having saturating characteristics. In such a circuit arrangement as is illustrated in FIGURE 4, the power of relatively high voltage and low current (for example, 30 volts and 1 ampere) of an alternating-current power source 1 is first rectified in a simple manner by a rectifier 3 and a smoothing capacitor 5, and the rectified power is used to activate a direct-current → rectangular-wave generator 15, for example, a so-called Royer circuit. The output of this circuit is again rectified by the rectifiers 3a and applied to thermoelements 6. By this arrangement, the output of the direct-current → rectangular-wave generator 15 assumes the form of the curve 11 in FIGURE 3. Accordingly, even with the use of a semiconductor rectifier of poor characteristic in the low-voltage region as indicated in FIGURE 2, a waveform which has a small form factor and is relatively close to direct current, as indicated by the curve 12 of FIGURE 3, is obtained, wherefore a smoothing circuit is not specially needed.

It is to be noted that the rectifying circuit, the primary smoothing capacitance, and the direct-current → rectangular-wave generator may be of any circuit type. Moreover, the power for the said rectangular-wave generator may be supplied from means such as a storage battery, in which case, since the voltage can be readily and freely selected, the voltage to be impressed on the thermoelement can be readily selected, whereby temperature control can be readily accomplished.

An embodiment of the present invention as described above is shown in FIGURE 4. By means of such a circuit, elemental parts of semiconductor devices such as transistor diodes are cooled, and noise is reduced. For example, a germanium transistor is cooled to lower the collector saturation current $I_{co}$ and flicker noise and zero drift are removed. As another example, a CdS cell is cooled, and the signal-to-noise ratio, as that of a photoelectric transducer, is increased. As a further example, parametric diodes are cooled to increase the signal-to-noise ratio of a parametric amplifier. Such applications require, especially with miniaturization, as low a temperature as possible (as large a value of $\Delta T$ as possible). The present invention effectively fulfills this requirement through the use of an economical apparatus.

Although the present invention has been described in conjunction with a particular embodiment thereof, it is to be understood that modifications and variations may be resorted to therein without departing from the spirit and scope of the invention, as those skilled in the art will readily understand, and such modifications and variations are to be considered as being within the purview and scope of the invention and appended claim.

What is claimed is:

A thermoelectric cooling device comprising, in combination, a thermoelement for cooling miniature semiconductor components at high response speed; an alternating power source; semiconductor rectifying means for rectifying the voltage of said power source; a semiconductor rectangular wave oscillator wherein the rectified voltage is the operating voltage for said rectangular wave oscillator means for full-wave rectifying output of said rectangular wave oscillator; said thermoelement being directly connected to the full-wave rectifying output.

References Cited by the Examiner

UNITED STATES PATENTS

| | | | |
|---|---|---|---|
| 2,883,539 | 4/1959 | Bruck et al. | 321—44 X |
| 2,948,841 | 8/1960 | Locanthin et al. | 321—2 |
| 3,048,764 | 8/1962 | Murphy | 331—113.1 |
| 3,051,914 | 8/1962 | Brown | 331—113.1 |
| 3,079,484 | 2/1963 | Shockley | 219—20.41 |
| 3,192,464 | 6/1965 | Johnson et al. | 321—2 |

OTHER REFERENCES

Communications and Electronics, July 1955, pp. 322–325, Royer article.

Electronic Industries, Texas Instruments Advertising, September 1959, p. 55.

JOHN F. COUCH, *Primary Examiner.*

RICHARD M. WOOD, *Examiner.*

L. H. BENDER, W. H. BEHA, *Assistant Examiners.*